United States Patent [19]

Waldenmeier et al.

[11] 4,055,274
[45] Oct. 25, 1977

[54] DUAL LID FOR CLOSING COUPLED OPENINGS

[75] Inventors: Günter Waldenmeier, Karlsruhe; Wilhelm Hempelmann, Leopoldshafen, both of Germany

[73] Assignee: Gesellschaft für Kernforschung m.b.H., Karlsruhe, Germany

[21] Appl. No.: 715,171

[22] Filed: Aug. 17, 1976

[30] Foreign Application Priority Data

Sept. 12, 1975 Germany .............................. 2540722

[51] Int. Cl.² ...................... B65D 45/00; B65D 51/18
[52] U.S. Cl. ..................................... 220/256; 220/315
[58] Field of Search .............. 220/256, 234, 314, 315, 220/316, 256, 315

[56] References Cited

U.S. PATENT DOCUMENTS

| | | | |
|---|---|---|---|
| 2,198,125 | 4/1940 | Nelson | 220/256 |
| 3,130,583 | 4/1964 | Greve et al. | 220/234 X |
| 3,261,627 | 7/1966 | Wallden | 220/315 X |
| 3,365,096 | 1/1968 | Muehl | 220/314 |
| 3,744,670 | 7/1973 | DeFrees | 220/314 |
| 3,945,454 | 3/1976 | Kinoshita et al. | 220/316 X |

*Primary Examiner*—William Price
*Assistant Examiner*—Steven M. Pollard
*Attorney, Agent, or Firm*—Spencer & Kaye

[57] ABSTRACT

A dual lid assembly for closing first and second coupled openings, has entirely separable first and second lids for closing fluid-tight the first and the second opening, respectively. The dual lid assembly further includes a lid connecting device for coupling fluid-tight the two lids to one another; a first actuating device coupled to the lid connecting device for operating the latter by an externally-applied force; a lid locking device for tightening the first lid to a wall defining the first opening; a second actuating device coupled to the lid locking device for operating the latter by an externally-applied force. The second actuating device includes an actuating element connected to the lid locking device and displaceable parallel to the axis of the first lid. There is further provided a bearing unit attached to the first lid in the center thereof; an actuator pin attached to a mid portion of the actuating element and slidably supported in the bearing unit. The actuator pin has a terminus projecting outwardly of the bearing unit and oriented away from the attachment between the actuator pin and the actuating element. A spring contained in the bearing unit and engaging the actuator pin urges the latter outwardly from the bearing unit in the direction of the pin terminus. The actuator pin and the spring form part of the second actuating device. A seal supported in the bearing unit and surrounding and engaging the actuator pin ensures that the actuator pin passes through the bearing unit in a sealed manner.

5 Claims, 1 Drawing Figure

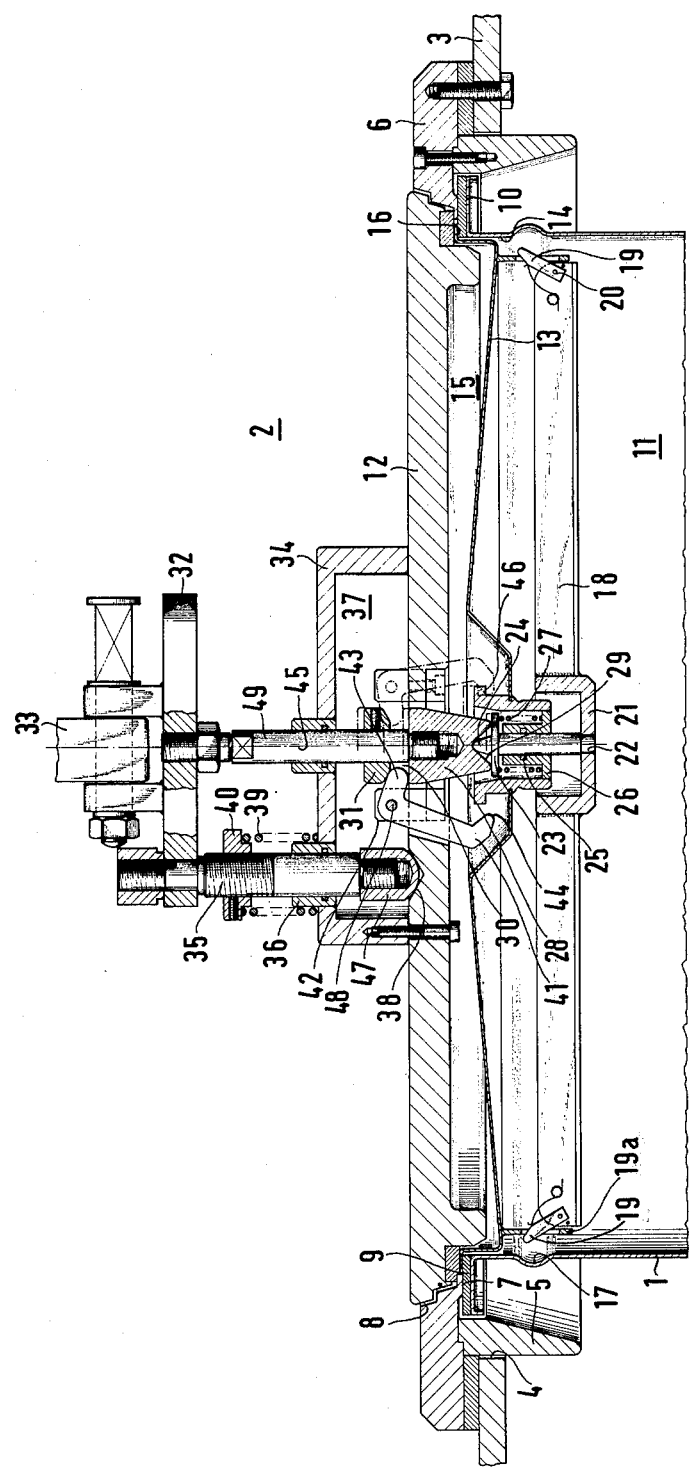

DUAL LID FOR CLOSING COUPLED OPENINGS

BACKGROUND OF THE INVENTION

This invention relates to a dual lid assembly for closing two interconnectable openings and serves in particular for coupling a container, accommodating radioactive or toxic materials, to a hot cell. The dual lid assembly is of the type which has lower and upper halves (hereafter referred to as "lower lid" or "first lid" and "upper lid" or "second lid", respectively) that may be connected to one another in a fluid-tight manner by an externally actuated mechanism. The lower lid which is oriented towards the container, can be locked to the inner side of the container wall by means of an externally actuated mechanism with the interposition of an actuating element disposed in the container and displaceable parallel to the longitudinal axis thereof.

An important problem in nuclear installations is the contamination-free removal and introduction of radioactive materials, particularly radioactive wastes, from glove boxes or hot cells into non-contaminated spaces. Because of the extremely high likelihood or contamination between the glove boxes and hot cells and the adjoining handling space, the solution of this problem involves stringent requirements regarding the fluid-tight nature of the systems. In a particular example, the significantly contaminated radioactive wastes are to be removed from the treating cell of a decontamination device into the charging and discharging cell of the waste containers. The containers for the radioactive wastes have to be contamination-free on the outside to comply with storage requirements concerning terminal dumps. In the cell itself activities having an order of magnitude of a few thousand Ci's are usually present.

A known dual lid system of the above-outlined type is actuated by compressed air for positioning a sheet metal lid on an iron-hopped barrel. The upper side of the sheet metal lid is to be maintained uncontaminated; this is achieved by means of a counter lid operated by compressed air. This system is disadvantageous in that the lid requires an O-ring seal and that the shape of the lid is cylindrical. As a result, upon positioning the lid on the barrel, the air in the barrel is compressed so that the lid, upon releasing the barrel, tends to snap out of its position and thus the sealing effect is lost. This is disadvantageous in that the lid is no longer "alpha-tight" and in case the barrel is tilted or tips over, the lid loses its force-locking relationship with the barrel.

There is known another dual lid system which makes possible the positioning of the lid in a force-locking manner but which, however, has a very complex mechanism. A proper operation of this lid system depends on very accurate tolerances of the barrel since the latter, although it is a commercially available sheet metal barrel, can be improved with regard to its tolerances only in a very expensive manner. The mechanism of this dual lid system depends on complex electric switching operations, so that even in case of minor malfunctions, major damages in the structure may result. Further, difficulties are encountered in the coupling of the two lids in case malfunctions occur or if tolerances are exceeded. This results in a substantial danger of contamination.

SUMMARY OF THE INVENTION

It is an object of the invention to provide an improved dual lid assembly of the above-outlined type from which the discussed disadvantages are eliminated and which does not need complex electric and mechanical switching arrangements.

It is a further object of the invention to provide an improved dual lid assembly wherein the loosening and the locking of the lid can be performed by a single mechanism driven by a reciprocating motor or power cylinder.

These objects and others to become apparent as the specification progresses, are accomplished by the invention, according to which, briefly stated, the dual lid assembly for closing first and second coupled openings, has entirely separable first and second lids for closing fluid-tight the first and the second opening, respectively. The dual lid assembly further includes a lid connecting device for coupling fluid-tight the two lids to one another; a first actuating device coupled to the lid connecting device for operating the latter by an externally-applied force; a lid locking device for tightening the first lid to a wall defining the first opening; a second actuating device coupled to the lid locking device for operating the latter by an externally-applied force. The second actuating device includes an actuating element connected to the lid locking device and displaceable parallel to the axis of the first lid. There is further provided a bearing unit attached to the first lid in the center thereof; an actuator pin attached to a mid-portion of the actuating element and slidably supported in the bearing unit. The actuator pin has a terminus projecting outwardly of the bearing unit and oriented away from the attachment between the actuator pin and the actuating element. A spring contained in the bearing unit and engaging the actuator pin urges the latter outwardly from the bearing unit in the direction of the pin terminus. The actuator pin and the spring form part of the second actuating device. A seal supported in the bearing unit and surrounding and engaging the actuator pin ensures that the actuator pin passes through the bearing unit in a sealed manner.

Further, the bearing unit advantageously has a circumferential collar at its upper end which projects upwardly from the lower lid and which is oriented away from the inner space of the container. In such an arrangement it is particularly advantageous to support U-shaped levers (constituting clamps) on the upper lid. One arm of each lever has a claw to engage behind the collar, while the other arm of each lever is form-fittingly movable in a circumferential channel provided in a centering hub which, in turn, is displaceable parallel to the central axis of the container (which, when the lower lid is in place on the container, coincides with the lid axis).

According to a particularly advantageous embodiment, the centering hub has at its lower end a conical opening and is disposed at a lower end of a stub shaft which is displaceably supported in an attachment positioned on the upper lid. The centering hub is connected at its upper end with a suspension device by a holder plate. Further, between the attachment and the holder plate there are arranged biased compression springs. According to a further feature of the invention, the actuator pin has a conical tip which extends into the conical opening of the centering hub in the assembled state of the two lids and further, the centering hub is, together with the stub shaft and the holder plate, axially displaceable by the actuator pin.

BRIEF DESCRIPTION OF THE DRAWING

The sole FIGURE is an axial cross-sectional view of a preferred embodiment of the invention.

DESCRIPTION OF THE PREFERRED EMBODIMENT

Turning now to the FIGURE, there is illustrated the upper part of a barrel 1 for receiving radioactive waste. The opening of the drum is to be coupled to the inner space 2 of a hot cell in a gas-tight and contamination-tight manner for the transfer of radioactive waste from the hot cell to the barrel. For this purpose, in the floor 3 of the hot cell there is provided an opening 4 in which there are arranged in a fluid-tight manner a centering ring 5 for the barrel 1 and a further ring 6 which has a downwardly oriented radial sealing face 7, thus forming the charging opening 8 proper. The barrel 1 is pressed against the sealing face 7 with a seal 9 positioned on the barrel flange 10 so that the inner space 11 of the drum 1 is coupled to the inner cell space 2 while a circumferential seal is provided with respect to the outer environment. In the opening 8 there is disposed a dual lid assembly which closes and seals both the charging opening 8 and the barrel 1.

The upper lid 12 of the dual lid assembly is associated with the charging opening 8 whereas the lower lid 13 of the dual lid assembly cooperates with the opening 14 of the barrel 1. As it will be discussed in detail later, the two lids 12 and 13 can be coupled with one another in a gas-tight manner, so that a contamination-free intermediate space 15 is provided therebetween.

The lower, or first, lid 13 which seals the barrel 1 at the sealing face 16 is locked to the wall of the barrel 1 with the aid of a circumferential groove 17 which is provided in the inner wall of the barrel 1. For achieving this locking arrangement there is provided an actuating element such as a bolting cross 18 formed, for example, of four radially outwardly extending bars affixed at their inner end to a cup-shaped center piece 21. The free ends of the bolting cross 18 each carry locking pins 19, the ends of which are rounded and which are swingably supported by pivot pins 20. The locking pins 19 project through openings provided in a skirt member 19a affixed to the underside of the lid 13 and surrounding the bolting cross 18. By virtue of the cooperation between each locking pin 19 and the skirt member 19a, upon axial upward or downward motion of the bolting cross 18 relative to the lid 13, the locking pins 19 will pivot into an operative and a withdrawn position, respectively. The path travelled by the free outer end of the locking pins 19 and the length of each locking pin 19 are so dimensioned that in the upper terminal position (locking position) of the bolting cross 18 the tip of each locking pin 19 extends into the groove 17 provided in the inner wall of the barrel 1. In this position, the lower lid 13 is firmly pressed against the sealing face 16 and thus the barrel 1 is closed in a fluid-tight manner. In the other, lower terminal position of the bolting cross 18, the locking pins 19 are pivoted upwardly into their withdrawn position so as to permit an upward removal of the lower lid 13 from the barrel 1.

To the inside of the cup-shaped center piece 21 there is affixed an axially upwardly extending actuator pin 22 which has at its upper end a collar 23 and is, beyond the collar, provided with a rounded terminal tip 24. Below the collar 23 the actuator pin 22 passes through a bearing sleeve unit 26 which is axially displaceable with respect to the actuator pin 22 and which is provided with a sealing ring 25 surrounding and engaging the actuator pin 22. In the inner space of the bearing unit 26 there is arranged a compression spring 27 which engages the collar 23 of the actuator pin 22 and an inner shoulder of the bearing unit 26. The compression spring 27 urges upwardly the actuator pin 22 with the connected components, such as the bolting cross 18. The bearing unit 26 is mounted fluid-tight in a central opening of the sheet metal body of the lower lid 13, so that the axial opening provided for the actuator pin 22 and sealed by the O-ring 25 constitutes the sole aperture in the lower lid 13. As will be described in detail later, in this manner it is possible to actuate the above-described locking mechanism for tightening the lower lid 13 to the barrel 1 by exerting a force on the exposed pin tip 24 to cause an axial displacement of the actuator pin 22.

For effecting an axial displacement of the actuator pin 22, first a centering hub 28 is positioned on the terminus 24 of the pin 22. The centering hub 28 comprises a conical body which at its lower end has a central conical recess 29 into which the terminus 24 of the actuator pin 22 extends in a self-centering manner. Above the centering hub 28 which is mounted on the lower end of a stub shaft 49, there is arranged a circumferential channel 30 which is either machined directly into the centering hub 28 (and thus constitutes a groove thereof) or, as illustrated, is formed between a separate ring 31 inserted on the stub shaft 49 and the centering hub 28. The stub shaft 49 is, together with the hub 28, coupled by various structural components with the upper, or second, lid 12 in such a manner that it is capable of executing a certain stroke (axial displacement) with respect to the upper lid 12. By means of this stroke a clamping of the two lids 12 and 13 to one another is achieved, as it will be described below.

The stub shaft 49 is, at its upper end, secured to a holder plate 32 which, in turn, is carried by a suspension device 33, such as a bolt, hook, or the like. The holder plate 32 extends parallel to the upper lid 12 to the outer face of which (oriented towards the hot cell 2) there is centrally affixed (for example, by screws) a bowl-shaped attachment 34. The attachment 34 serves, on the one hand, for protecting the clamping mechanism (to be described below) against contamination and, on the other hand, constitutes an abutment and countersupport for a plurality of spring-loaded pins 35 attached to the holder plate 32. Each spring-loaded pin 35 projects into the inner space 37 of the attachment 34 in a sealed manner through a bearing sleeve 36 held in the wall of the attachment 34. The spring-loaded pins 35 may be six in number and may be distributed in a circular array along the circumference of the holder plate 32. Each spring-loaded pin 35 has its lower end a pressing piece 47 which, in the lower end position of the spring-loaded pin 35, engages an associated depressed portion 38 of the upper lid 12.

To each spring-loaded pin 35 there is affixed a spring support collar 40. A coil spring 39 surrounds each pin 35 and engages, with opposite ends, the upper, radial face of the attachment 34 and the spring support collar 40 for resiliently urging the pin 35 away from the upper lid 12. Since the spring-loaded pins 35 and the stub shaft 49 are all carried by the holder plate 32 by means of threaded engagement therewith, the centering hub 28 is urged upwardly, away from the lower lid 13.

To the central zone of the upper lid 12 there is attached a ring-like support 42 which surrounds the centering hub 28 and which supports, by pivot pins 48, a plurality of circularly distributed swingable tightening clamps 41. Each clamp 41 has an angled lever portion 43 which extends into the channel 30 and a claw 44 which cooperates with the collar 46 of the bearing unit 26. Thus, if the stub shaft 49 moves upwardly, together with the centering hub 28, the clamps 41 pivot counterclockwise into an operative position towards the central axis 45 of the entire assembly. In such operative position, each claw 44 is adapted to engage behind the collar 46, whereby the two lids 12 and 13 are tightened to one another.

This position of engagement (operative position of the clamps 41) is illustrated in dash-dot lines to the right of the axis 45 (the centering hub 28 is in its upper position), whereas the inoperative outwardly pivoted position of the clamps 41 is shown in solid lines to the left of the axis 45 (the centering hub 28 is in its lower terminal position).

In the description that follows, the operation of the dual lid assembly will be set forth.

The barrel 1, carrying the lower lid 13 (which, at this time, is entirely separated from the remainder of the dual lid assembly) is, by means of a hoisting device (not shown) moved against the floor 3 of the hot cell and thus, against the upper lid 12 which forms part of the dual lid assembly and which is accommodated in the hot cell. At this time the clamps 41 are in their outwardly swung, inoperative position. As the barrel moves upwardly with the lower lid 13, the tip 24 of the actuator pin 22 penetrates into the conical centering recess 29. The abutting relationship between the centering hub 28 and the collar 23 of the actuator pin 22 during continuing upward movement of the barrel 1 effects a downward movement of the bolting cross 18, whereupon the locking pins 19 swing upwardly and out of the groove 17. Thus, the lower lid 13 is now unlocked from the barrel 1 and the terminus 24 of the actuator pin 22 is automatically centered above the collar 23 in the recess 29 of the hub 28. Consequently, the lower lid 13 is no longer attached to the barrel 1 and, simultaneously it is centered on hub 28 of the upper lid 12. Subsequently, the hub 28 is displaced upwardly by the actuator pin 22 as the barrel 1 continues its upward motion. As a result, the pins 35 are lifted and simultaneously untensioned. As the hub 28 moves upwardly, the channel 30 pulls the clamps 41 behind the collar 46 of the bearing unit 26 of the lower lid 13. As a result, the two lids 12 and 13 are now mutually clamped to one another. The force of the springs 39 exerted on the pins 35 supplies the permanent resilient force with which the two lids 12 and 13 are pressed to one another. The two lids 12 and 13 clamped to one another can now be moved upwardly as a unit. For closing the barrel 1, the above-described operations are effected in a reverse order.

If for certain operational conditions, for example, if the container is to be turned upside down or, if it is to be emptied in a horizontal position, a greater clamping force is necessary, the clamping of the two lids is effected not by a spring force but, for example, by means of a pneumatic cylinder or electromagnets. In such a case, the two lids are advantageously clamped to one another by means of a linkage system operated by the cylinder and engaging the channel 30.

It is a particular advantage of the dual lid assembly designed according to the invention that a significant simplification over prior art structures is achieved. Instead of the different, necessarily motor-driven components there is needed only a sole mover to execute a single stroke. This stroke may be effected by means of a pneumatic cylinder, a motor, or a crane, resulting in a significant simplification of the actuating mechanism. Further, the components are simpler and less expensive, the centering of the dual lid assembly is effected automatically in a positive manner and a preliminary centering of the lower part of the dual lid on the barrel is no longer required. One of the most important advantages of the invention resides in the fact that commercially available sheet metal barrels with the usual manufacturing tolerances can be handled. In this manner substantial savings are achieved regarding operational expenses which otherwise would require the introduction of new barrels. Further, by reducing the number of the mechanical components and by simplifying the entire system, the operational safety of the assembly is significantly increased.

It will be understood that the above description of the present invention is susceptible to various modifications, changes and adaptations, and the same are intended to be comprehended within the meaning and range of equivalents of the appended claims.

What is claimed is:

1. In a dual lid assembly for closing first and second coupled openings, the lid assembly including a first lid for closing fluid-tight the first opening and a second lid for closing fluid-tight the second opening, the two lids being entirely separable from one another and each having a lid axis; lid connecting means for coupling fluid-tight the two lids to one another; first actuating means coupled to the lid connecting means for operating the lid connecting means by an externally-applied force; lid locking means for tightening the first lid to a wall defining the first opening; second actuating means coupled to the lid locking means for operating the lid locking means by an externally-applied force; the improvement comprising:
  a. a bearing unit attached fluid-tight to the first lid in the center thereof;
  b. a circumferential collar attached to said bearing unit, said circumferential collar being arranged at that side of said first lid which is oriented away from said first opening when said first lid is in position thereon; said circumferential collar projecting radially from said bearing unit with respect to the axis of said first lid;
  c. a centering hub arranged in alignment with and displaceable parallel to the axis of said second lid;
  d. hub supporting means attached to said centering hub and secured to said second lid;
  e. means defining a circumferential channel provided in said centering hub; and
  f. a plurality of clamps movably supported on said second lid; each clamp having an actuating portion projecting into said channel for moving said clamps into operative and inoperative positions by respective opposite axial motions of said centering hub; each clamp having a claw portion spaced from the respective actuating portion; in said operative position said clamps engaging, with their claw portion, behind said circumferential collar for securing said first and second lids to one another.

2. A dual lid assembly as defined in claim 1, wherein said hub supporting means includes a stub shaft arranged in axial alignment with the axis of said second lid and having an end to which said centering hub is attached; an attachment affixed to said second lid, said stub shaft passing through said attachment and being slidably supported thereby; a holder plate supporting said stub shaft; and a suspension means to which said holder plate is secured.

3. A dual lid assembly as defined in claim 2, further commmprising a compression spring arranged between said attachment and said holder plate for urging said clamps into said operative position with the intermediary of said stub shaft, said centering hub and said channel.

4. A dual lid assembly as defined in claim 2, further comprising means defining a conical recess in said centering hub; said conical recess being aligned with the axis of said second lid.

5. A dual lid assembly as defined in claim 4, wherein the second actuating means includes an actuating element connected to said lid locking means and displaceable parallel to the axis of said first lid; the improvement further comprising an actuator pin attached to a mid portion of said actuating element and being slidably supported in said bearing unit, said actuator pin having a conical terminus projecting outwardly of said bearing unit and being oriented away from the attachment between said actuator pin and said actuating element, said conical terminus being adapted to project into said conical recess of said centering hub; a spring means engaging said actuator pin for urging said actuator pin outwardly from said bearing unit in the direction of said terminus; said actuator pin and said spring means forming part of said second actuating means; and sealing means supported in said bearing unit and surrounding and engaging said actuator pin for sealingly passing said actuator pin through said bearing unit; said centering hub, said stub shaft and said holder plate being displaceable as a unit by said actuator pin for moving said clamps into said operative position.

* * * * *